United States Patent [19]
Attenborough

[11] 3,759,302
[45] Sept. 18, 1973

[54] WIRE FIXING DEVICE

[75] Inventor: Christopher George Attenborough, Winchelsea, England

[73] Assignee: National Research Development Corporation, London, England

[22] Filed: Aug. 3, 1972

[21] Appl. No.: 277,567

[30] Foreign Application Priority Data
Aug. 19, 1971 Great Britain.................. 38,988/71

[52] U.S. Cl....................... 140/119, 140/120, 32/66
[51] Int. Cl............................................. B21f 15/04
[58] Field of Search.................. 140/93.6, 118, 119, 140/120, 122, ; 32/14, 66

[56] References Cited
UNITED STATES PATENTS
2,943,650   7/1960   Rubin ............................... 140/119
FOREIGN PATENTS OR APPLICATIONS
432,847   8/1935   Great Britain...................... 140/119

Primary Examiner—Lowell A. Larson
Attorney—Cushman, Darby & Cushman

[57] ABSTRACT

A wire fixing device, for fixing wire in orthopedic surgery or other circumstances by controlled twisting together of the free end portions of the wire, comprises an elongate screw, a nut for engagement with the screw and having means for securing the free end portions of a wire to be fixed, a guide member with two passageways for the wire free end portions, and at least one slide member which extends from the guide member for longitudinal slidable engagement relative to and rotation with the nut. In use of the device the wire free ends are passed through the guide member passageways and secured with the nut, and the screw is screwed through the nut to draw this from the guide member and tense the wire. Then, the nut is screwed towards the guide member to twist the wire while feeding wire into the twist in a controlled manner to avoid breakage through excess tension build-up.

7 Claims, 1 Drawing Figure

PATENTED SEP 18 1973
3,759,302
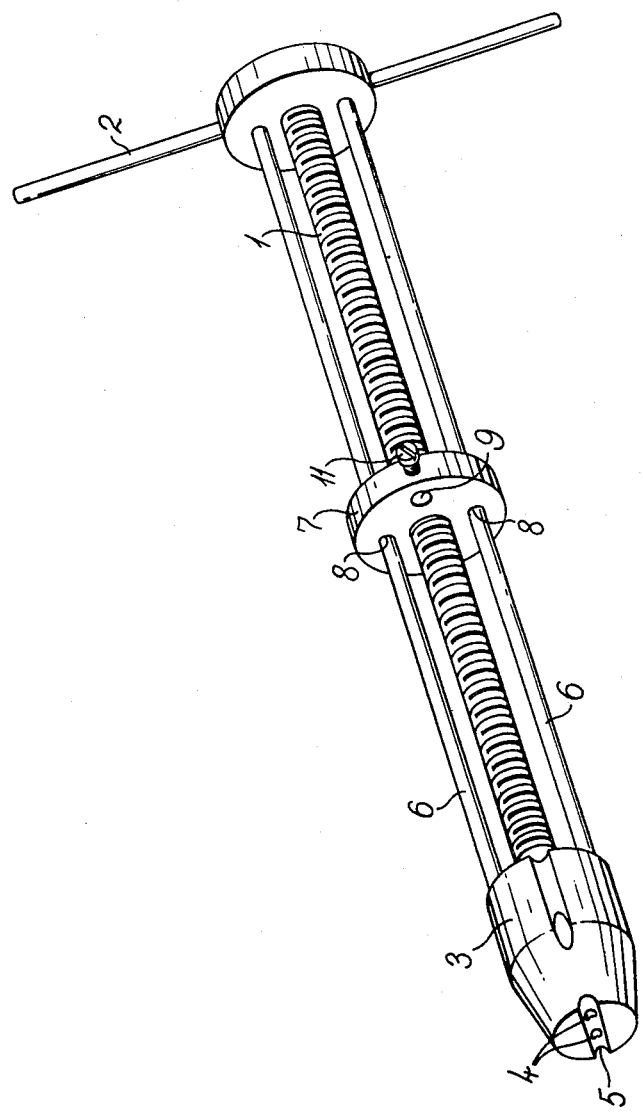

WIRE FIXING DEVICE

There are many situations in which wire is used as a fixing medium by wrapping, lacing or otherwise arranging a length of wire, whereafter the free ends of the wire are twisted together to tension and effectively lock the length in position. However, it is also often the case that during the course of twisting the free ends, the wire becomes over-tensioned, yields and breaks in the region where the main length joins the twisted part. This difficulty is more likely to arise in a confined site or other circumstances where the state of the tensed and twisted wire cannot be readily viewed to guard against application of excess tension. Such circumstances often arise in connection with the fixing of surgical wire during orthopaedic surgery.

An object of the present invention is to reduce this difficulty and the invention has been developed primarily for the last-mentioned circumstances. However, the invention may well find application in other similar circumstances.

In any event, the invention provides a wire fixing device comprising an elongate screw member, means for rotating said screw member at one end thereof, a nut for threaded engagement with said screw member, means for securing with said nut the free end portions of a wire to be fixed, a wire guide member for location adjacent the other end of said screw member remote from said rotating means and which guide member has two passageways therethrough for receipt of said wire free end portions to pass to said nut and securing means, and at least one elongate slide member connected to said guide member to extend therefrom alongside said screw member for engagement with said nut, said slide member and said nut being engageable to allow relative sliding therebetween in the longitudinal axial direction of said screw member, and to cause said slide member to rotate with said nut relative to said screw member.

In order that the invention may be more clearly understood the same will now be described, by way of example, with reference to the accompanying drawing which diagrammatically illustrates one embodiment of the invention.

The illustrated embodiment comprises an elongate screw member in the form of a rod 1 threaded along its whole length except at one end where a handle 2 is connected to facilitate manual rotation of the rod.

A wire guide member 3 is provided in the form of a generally cylindrical member tapered towards one end in which a pair of passageways 4 are bored to emerge in diametrically opposed locations at the other end of the guide member. The passageways 4 are preferably mutually inclined, being more closely spaced at the tapered end of the guide member 3 than the other end thereof. Also, the passageways need not necessarily be of constant cross-sectional dimensions along their lengths, but can be funnelled or associated with some other formation such as the groove 5 to facilitate feeding of wire ends into the passageways at the tapered end of the guide member. The passageways can also be outwardly funnelled or opened laterally towards the other end of the guide member as shown in the drawing.

The guide member is also provided with a pair of elongate slide members in the form of rods 6 which will normally not be longer than rod 1. The slide rods 6 extend in the axial direction from the wider end of the guide member and from diametrically opposed locations on such end, these locations being at 90° circumferential spacings between those of the passageways 4. This geometrical relationship between the passageways 4 and the slide rods 6 relative to the longitudinal axis of the guide member is termed a "quadrature" relationship and it will be seen that the same relationship is held relative to the axis of the screw member in the assembled device.

A nut 7 is provided for threaded engagement with the rod 1. This nut has a pair of axially directed passageways 8 therethrough at diametrically opposed locations to slidably receive the slide rods 6, and a similar pair of passageways 9 in quadrature relationship with the passageways 8 relative to the longitudinal axis of the nut, and also to the rod 1 when the nut is engaged therewith. The passageways 9 form part of the wire securing means in association with respective threaded radial passageways 10 which intersect the passageways 9 and receive bolts 11 to secure respective free end portions of a wire passed into or through the passageways 9 in use of the device to fix the wire in question.

It will be seen from the drawing and above description of components that the nut 7 can be threaded on the rod 1 and located in an angular disposition to receive the slide rods 6 in the passageways 8, the latter components being translated until the relevant end of rod 1 abuts the wider end of the guide member 3. Given the aforementioned angular disposition, the passageways 4 emerging from the wider end of the guide member are effectively aligned with the passageways 9 in the nut 7.

In use of the device, the free end portions of a wire to be fixed can be passed through the passageways 4, by first entering the tapered end of the guide member, to the respectively aligned passageways 9, and secured in the latter passageways by screwing in the bolts 11. Then the handle 2 can be turned, while holding the nut, the slide rods and the guide member against rotation (these components 11 being keyed for rotation together), to draw the nut towards the handle and so tense the wire. It will be appreciated that this operation involves reaction of the rod 1 abutted against the guide member and also, of course, reaction of the wire against the article or articles around and/or through which it is passed. Finally, the preceding operational functions are interchanged by holding the handle against rotation while rotating the nut (conveniently by gripping the bolts 10). This rotation of the nut causes it to move along the rod 1 towards the guide member and, at the same time, to rotate the guide member by way of the slide rod interconnection. This results in twisting the wire end portions adjacent the tapered end of the guide member while feeding wire from between such member and the nut. The pitch of the nut-and-screw rod mechanism can be so chosen for a range of wire gauge that wire is fed into the twist at a sufficient rate to obviate over-tensioning and breakage, but without relaxing the twisted wire tension unduly. Moreover, it will be noted that the device does not necessitate further and awkward handling of the wire at the immediate site where it is to secure some other assembly, since the wire can be threaded through the device passageways and the subsequent rotational operations be effected outside this immediate site. This is a particularly useful facility in connection with surgical wire as has been intimated earlier.

I claim:

1. A wire fixing device comprising:

an elongate screw member;

grip means connected with said screw member to facilitate rotation thereof;

a nut threadably engaged with said screw member;

means coupled with said nut for securing therewith the free end portions of a wire to be fixed;

a wire guide member located adjacent the other end of said screw member from said grip means, and having two passageways therethrough generally in the longitudinal axial direction of said screw member for receipt of said wire free end portions to pass to said nut and securing means;

and at least one elongate slide member connected at one end thereof to said guide member and extending therefrom alongside said screw member to said nut, said slide member being engaged with said nut for rotation therewith and sliding relative thereto in the longitudinal axial direction of said screw member.

2. A device according to claim 1 wherein said two passageways are located in said guide member in diametrically opposed manner relative to the longitudinal axis of said screw member.

3. A device according to claim 2 comprising two of said slide members located in quadrature relationship with said two passageways relative to the longitudinal axis of said screw member.

4. A device according to claim 1 comprising two of said means coupled with said nut for respectively securing said wire free end portions, such means being located in alignment with said two passageways.

5. A device according to claim 1 wherein said two passageways are mutually inclined in divergent manner through said guide member towards said screw member.

6. A device according to claim 1 wherein said two passageways are each outwardly funnelled at at least one pair of corresponding ends thereof.

7. A device according to claim 1 wherein said screw member is at least as long as said slide member so that said screw member abuts said guide member.

* * * * *